United States Patent [19]

Sharpe, II

[11] Patent Number: 4,741,047

[45] Date of Patent: Apr. 26, 1988

[54] INFORMATION STORAGE, RETRIEVAL AND DISPLAY SYSTEM

[75] Inventor: Louis H. Sharpe, II, Washington, D.C.

[73] Assignee: Computer Entry Systems Corporation, Silver Spring, Md.

[21] Appl. No.: 841,615

[22] Filed: Mar. 20, 1986

[51] Int. Cl.⁴ .................................................. G06K 9/36
[52] U.S. Cl. ........................................ 382/56; 382/48; 358/260
[58] Field of Search ................. 382/56, 57, 61, 48; 358/260, 261; 340/347 DD

[56] References Cited

U.S. PATENT DOCUMENTS

| 4,092,677 | 1/1978 | Saran | 358/261 |
| 4,207,599 | 6/1980 | Murayama et al. | 340/347 DD |
| 4,301,469 | 11/1981 | Modeen et al. | 382/56 |
| 4,589,144 | 5/1986 | Namba | 382/61 |
| 4,626,824 | 12/1986 | Larson | 358/261 |
| 4,633,326 | 12/1986 | Endoh et al. | 382/56 |

Primary Examiner—Leo H. Boudreau
Attorney, Agent, or Firm—Oblon, Fisher, Spivak, McClelland & Maier

[57] ABSTRACT

A method and apparatus for processing and selecting image information to be stored from a document only when the information on the document is relevant and associating the selected information with machine-read information from the document for either on-line or off-line adjustment of previously stored information in a main data base.

15 Claims, 2 Drawing Sheets

INFORMATION STORAGE, RETRIEVAL AND DISPLAY SYSTEM

BACKGROUND OF THE INVENTION

1. Field of the Invention

The present invention relates to the area of processing information and particularly to the selection and storage of relevant non-machine readable information and associating the selected information with machine-read information.

2. Discussion of Background

Information storage, retrieval and display systems utilized in a business environment, and particularly an environment where there is a requirement for communication with customers by way of billing procedures, often utilize pre-printed forms which the customer must utilize in his reply, primarily to be returned with his payment. These returned forms are machine read and coordinated with the enclosed payment or they must be hand checked with respect to the amount of payment, the enclosed check and any other correspondence from the customer.

While the technology with respect to letter opening and machine scanning has advanced to the point where there is minimal human intervention, problems do arise with respect to hand written or any other non-machine recognizable coding or printing which either the company or the customer has placed on the form.

One type of system which deals with machine storage of non-machine readable information concerns the use of a optical scanner or a digitized camera apparatus which forms an image of the object which is then subjected to a compression operation and subsequently stored. The stored information can then be later read out or examined. While the utilization of compression techniques obviously provides for a savings in regard to storage size, it still requires the utilization of enough space so that all documents can be stored after compression.

In order to determine the content of any communication from the customer the document must be visually inspected upon receipt or after storage. If the customer has not provided any information on the document this is not able to be discerned except by visual verification either upon opening of the envelope or after storage of the compressed data representing the document. Of course once the document is stored it must be expanded and displayed before it can be inspected.

Even if the prior art types of devices are utilized to obtain an image of the item received, there is usually a limited amount of space available on the front of a form which is to be returned in a normal size envelope. The typical situation where a customer may add information to a received billing form exists where a change of address is about to occur. It is quite common for space for such change of addresses to be provided on the back of the form. In either event it requires individual human intervention in order to detect the address change or to store an image of the entire form for subsequent compression and storage which will be followed by inspection upon expansion and display. Once again the problem in this area concerns the requirement for each document to be either inspected or imaged and stored whether or not an address change has occurred.

The change of address form being provided on the back of the bill compounds the problem because it requires the operator to inspect the back of each document upon opening of the document to determine those having a change of address.

These same problems which have been illustrated with respect to a billing format are seen to exist in other information retrieval systems which deal with non-machine readable markings provided by alterations on the surface of the document including endorsements and stampings provided after the initial formation of the document and which contain information vital to a corresponding account number associated with the document.

SUMMARY OF THE INVENTION

Accordingly, one object of this invention is to provide a novel information storage and retrieval system which overcomes the problems of the prior art and which provides for storage of only relevant information. The information system utilizes a digital image forming device in order to provide a digital representation of an image which is subsequently compressed through the utilization of a compression system and a further detection of the size of the compressed area which is compared with a threshold value in order to provide for storage of only those documents which contain items of interest.

It is another object of the present invention to provide a system whereby the stored information of interest is coordinated with machine-readable information from the same document in order to provide for a display of previously stored information concerning the machine readable code on said document in conjunction with the display of the stored image of the document.

It is another object of this invention to provide a system whereby an invoice containing a change of address filled out by a customer can be compressed and stored for subsequent correction of the address information of only those invoices which contain new address information.

It is a further object of the present invention to provide a system whereby information on both sides of a document can be processing and correlated with each other in order to provide for storage and display of the back side of the document for only those invoices which contain an address correction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
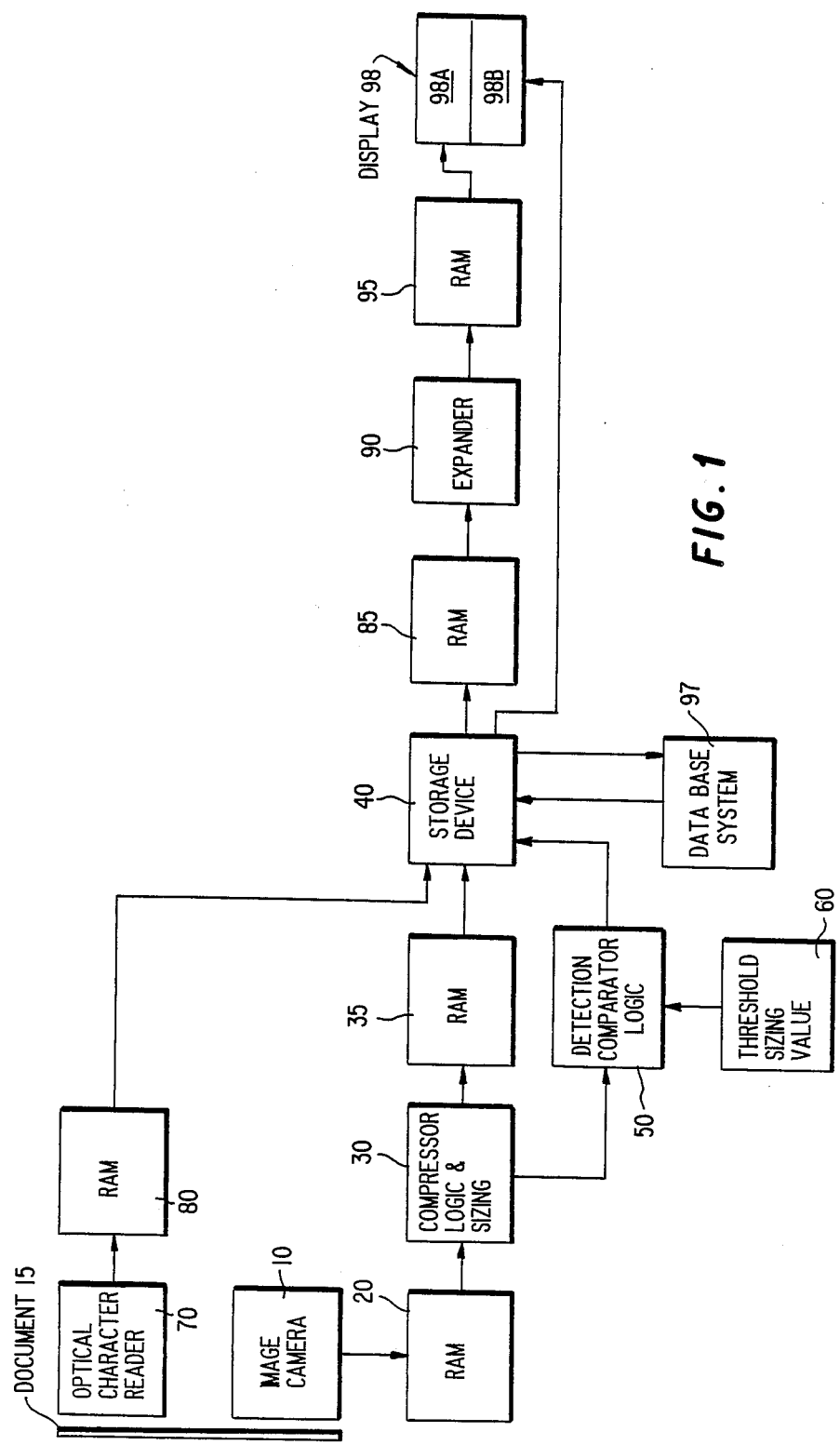
FIG. 1 is a block diagram of the information system according to the present invention.
Figure 2:
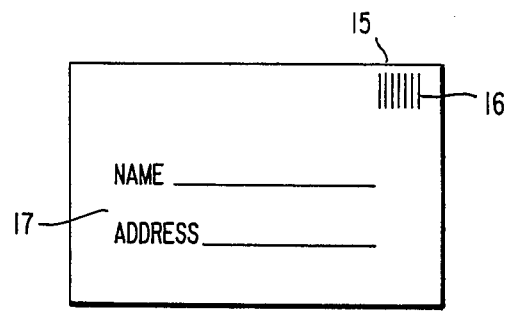
FIG. 2 is a representation of the face of a document of FIG. 1.

Referring now to the drawings, wherein like reference numerals designate identical or corresponding parts throughout the several drawings, and more particularly to FIG. 1 thereof, there is shown a document 15 which is positioned in front of the image camera 10 and the optical character reader 70. The document, illustrated for purposes of this embodiment of FIG. 1, is shown in FIG. 2 as containing a machine readable code 16 and a pre-printed form 17 which is supplemented by hand-written material. The hand-written material is the subject of interest and the system of FIG. 1 is specifically configured and structured to provide for a display of the portion 17.

The image camera 10 and its associated circuitry provides a digitized output to be stored in the RAM 20 and subsequently to be subjected to a compression and size detection in the compression logic and sizing circuit 30. The image camera 10 may be one of a variety of available digitizing camera image processing systems while the compression logic and sizing device 30 may be any one of a number of systems which conform, for instance, to the standards of CCITT compression techniques or any other redundancy reduction technique. The compression logic and sizing operation provides to the RAM 35 the compressed information corresponding to the original information 17 from the document 15.

Another output of the circuit 30 provides a sizing index which indicates the size of the compressed data in numerical terms and which is fed to the detection comparator logic 50 which provides a comparison between the size of the compressed data of the image 17 with a threshold sizing value obtained from the circuit 60. This pre-determined threshold value consists of the sizing value of the compressed data of the area 17 without the hand-written information. That is, in order to obtain the threshold sizing reference value, a compression of the pre-printed portion of information 17, without any later added customer information, either written or printed, is first accomplished and an additional factor is added to this value in order to take into account the positioning of the camera and any extraneous markings either made on purpose or inadvertently such as an X made through the entire document as for example which may be made by a customer who is attempting to show that no change is being made to his address.

If the sizing information passed from the logic 30 exceeds the threshold sizing value fed from the circuit 60, the detection comparator logic 50 outputs a store signal to the storage device 40 which is then instructed to store the input from the RAM 35. As a result of this structure this storage device 40 only contains compressed representations of images of those of the documents 15 which have hand-written address changes, for example. Of course, any other hand-written information in another type of document structure could be utilized as for example the detection of signatures on the back of documents requiring endorsements or any other material added to the document which was not in its original format. It is of course not necessary that the information be handwritten in order to be compressed and stored. It only requires that the information which exists on the document or portion of the document in front of the image camera 10 be greater than the information which is represented by the compressed threshold sizing value 60.

In order to provide complete information with respect to the document 15, typically such documents contain machine readable information 16 which is obtained by, for example, the optical character reader 70 and fed to the RAM 80 and subsequently to the storage device 40. The instruction to store which is fed from the output of the detector comparator logic 50 serves to store both the compressed representation of the image of the information 17 as well as the machine-readable information 16 from the character reader 70 into the storage device. This is important in the sense that it allows for the coordination between a customer's address change and some identification of the customer such as an account number. Thus the only information which is stored in the device 40 is the information with regard to the account number and the address change of those of the documents 15 which contain address changes. Once the document 15 has been "scanned" another document will replace it in a continuous format after the mail has been opened, for example, by a automatic letter opener. Thus, there is, at this point, no need for human operator intervention into the system and at the end of the day or at any convenient time a human operator can utilize the remaining portion of the system to provide for a display 98 and subsequent change of address being accomplished.

The output of the storage device 40 is fed into the RAM 85 and subsequently to an expander 90 upon command of an operator or in an on-line manner as shown in the FIG. 1. The display 98 via expander 90 and RAM 95 provides for an expanded or reconstructed image of the address change 98A and the account number can be associated with another data base in order to provide the information with respect to the customer's old address 98B.

The FIG. 1 illustrates a possible configuration which could be used to associate the account number obtained from the optical character reader 70 which is stored in the device 40 and the data base system 97. The file information or file number which is stored in the device 40 forms the basis for a query to the data base system 97 which functions to provide to the storage device 40 the "old address" corresponding to the query or account number. Once each of the "queries" have been "answered" with a proper response of the data base system and after all of the file numbers stored in storage device 40 have associated with them a corresponding "old address" from the data base system 97, then the storage device 40 acts to cross-reference the image stored from the compressor logic 30 and the data base "old address". This involves linking the files together utilizing pointers and is a software technique which is used to provide simultaneous release of the old address to the display 98*b* which is a character display and the "new address" to the display portion 98*a* which is a display of an image after it has been expanded. The simultaneous release of the storage device information including both the image containing the "new address" and the "old address" can be under the control of a microprocessor (not shown), for example. This entire association of the account number and the data base in order to obtain the information corresponding to the stored image which has been compressed, is merely one example which can be modified and which can be altered as known to those skilled in the art. The association of the old address with the new address is an obvious result once the invention has provided the method and the apparatus for determining that only the images of the true "address changes" will be stored in the storage device 40 in association with their account number. Prior art types of systems provide other methods for associating the file numbers and any information from a data base with newly added information.

Thus, the present invention provides the method and the apparatus whereby only invoices which contain address changes will be detected and stored in correspondence with their particular machine-readable account number without any human intervention. Once the "right" kind of information is stored, according to the present invention, then the remaining processing system as shown in FIG. 1 with respect to the data base system and its coordination of the new address with the old address stored in the device 40 can be accomplished as shown in FIG. 1 or by any of a number of modifications or methods without detracting from the main feature of the Applicants invention which concerns the determination of what document is to be compressed and stored and associating that stored document with a particular account number or machine read information. An advantage of this method for making such determination is that it makes additional use of the compressor, which would be required in the system anyway.

Therefore, when the operator, whose job it is to make the actual address changes into the data base, wishes to proceed the display 98 will scroll up one by one, from the expander 90 and the storage device 40, the handwritten address change and, simultaneously the customer's old address will be provided from a data base 97 accessible via a mainframe computer or other data base storage device. The expander circuit 90 must, of course, be a system which utilizes the reverse of the compression technique of the circuitry 30.

The utilization of the combination of the optical scanning character reading information with the compressed image being stored for only those documents having a change of address allows for significant savings in storage device size as well as providing a system whereby the human operator only examines documents containing an already verified address change. This change of address by the human operator into the main data base can be accomplished at any time after the storage of the documents which means that there is no need for a manual opening of the letter and an examination of the document to see if there is an address change. The document as soon as it is "imaged" and scanned can be passed on to the remaining features of any normal business processing such as, if it is an invoice, a billing procedure.

As indicated previously, the compression logic and sizing circuit 30 while providing an output to the RAM 35 which is the compressed representation of the original image also contains the sizing information to be fed to the detector comparison logic 50. This sizing information represents the amount or size of the compressed logic or in other words, the amount of information which has been compressed as to be distinguished from the actual compressed information which is fed to the RAM 35 and subsequently to the storage device 40. This information, with respect to the sizing portion of the device 30, represents the output of any one of a number of systems which conform, for example, to the CCITT image compression standards. In any of such systems, it is quite common for a sizing value to be available.

Although different types of systems may generate the sizing value by different means, this does not in any way inhibit the present invention because, no matter what system is utilized, the threshold sizing value storage 60 which serves as the one input to a comparison circuit in the detector comparator logic 50 contains information which was obtained from the same sizing circuitry 30. As a matter of fact, the threshold information can be derived, as indicated previously, by detecting information 17 from a document 15 in a standard form before it will have been altered by the consumer. This value then is multiplied by an additional. factor (somewhat greater than one) to eliminate storage of documents which contain small amounts of additional information such as the previously discussed crossing out or other slight alterations.

The particular type of system being used and the fine tuning necessary to provide an assurance of storage of only documents containing the desired additional information, is a factor which can be determined on a trial and error basis for the particular application. Some of these considerations may be that, for example, in the address correction scheme, some of the customers may simply put in a new street address and not fill in any change in city or not provide their name. This type of information would be desirable to be stored and therefore the adjustment of the threshold value especially the multiplication factor is essentially a preliminary trial and error process in the set up of the system or it may be an ongoing updating operation based on an "average size".

It is once again emphasized that the threshold sizing value is basically determined by running a "blank" document (without any customer alteration) through the system to determine the "size" of this document in terms of compressed units. This value is then multiplied by the above-discussed factor and used as the threshold sizing value to be compared with other documents which may or may not have been altered by the customers as they return them to the company. The detector comparison circuit 50 may be simply seen as a comparator which provides an output when the value of the sizing information from the circuit 30 exceeds the minimum value of the threshold sizing value 60. On the other hand, many schemes may be provided which are obvious variations such as constantly updating the value of the threshold sizing value depending upon ongoing measurements which would involve updating circuitry (not shown).

In any event, the basic concept of the present invention concerning the storage of only those documents containing customer modified forms which can be determined without human intervention and which can be later utilized to update customer information, remains as the essential feature which improves over the prior art type of systems.

Figure 3:
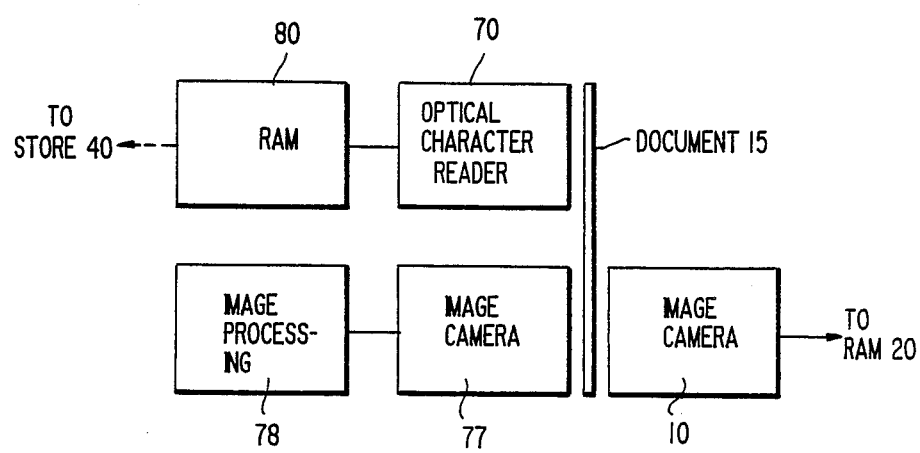
FIG. 3 is an alternate representation of the arrangement of the image camera and scanner of a document having information on both sides.

The FIG. 3 shows another arrangement for obtaining information from a document 16 which differs from the document 15 in that it contains information on both sides of the document. The image camera 10 and then subsequent circuitry which follows as illustrated by the RAM 20 correspond to the FIG. 1 with respect to providing a digital picture of one side of the document 16 and feeding it to a compression logic and sizing circuit 30 which is subjected to the same operation as is disclosed in FIG. 1. The optical scanner, is shown for purposes of illustration as being on the other side of the document wherein the optical character reader 70 and the RAM 80 are shown which again correspond to the optical scanning of information concerning, for example, the customer's account number in a manner similar to FIG. 1. Also shown in FIG. 3 is an image camera 77 and a subsequent image processing circuit 78 which may be used, as is typical, to provide information concerning billing procedures if, for example, the document is an invoice having payment information noted on the same side as the scanning. These procedures and the systems which utilize this image processing are the type of systems which were utilized prior to the present invention with respect to billing procedures. It is to be noted that the scanned information by the scanner 70 which is fed to the store 40 as shown in FIG. 3 may also be fed to the image processing circuit 78 in order to coordinate payment information with the account number, but it must be emphasized that the present invention, in the embodiment of FIG. 3, as in the embodiment of FIG. 1, concerns the coordination of the account number information from the optical scanner 70 with the stored information in the device 40. This stored information in the device 40 whether from the front side of a document as illustrated in FIG. 1 or from the rear side of a document as illustrated in FIG. 3 only concerns relatively few documents which contain information such as the address change provided by the customer.

Of course, the use of an invoice and an address change information has been discussed with respect to the embodiments of FIGS. 1 and 3, however, it must once again be emphasized that any type of document which may or may not be altered either by typing or handwriting, could be utilized most effectively in the present invention by eliminating visual inspection by an operator of a document to see whether or not it has been altered either on purpose or inadvertently. These items could include the endorsement of checks or the completion of applications or surveys.

It is also to be noted that the system of FIG. 1 can in part, or in whole, be under the control of microprocessors with respect to the coordination of the imaging camera and the optical scanner as well as the display 98 and its retrieval of information from the storage device 40 and from the main data base which provides the "old" information concerning a particular account number or customer.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An information system for storing relevant information on a document comprising:
   a digital image forming means outputting a digitized representation of all information on a document;
   a digital data compression means for compressing said digitized representation of said information;
   means for detecting the size of said compressed representation;
   means for comparing said detected size with a threshold value and outputting a store signal only when said compressed size exceeds said threshold value; and
   storage means for storing as relevant information said compressed digital representation of said information in response to said store signal.

2. The information system of claim 1 further comprising a means for expanding said stored compressed digitized representation.

3. The information system according to claim 1, wherein said digital image forming means is a digital camera.

4. The information system according to claim 1, wherein said image is contained on a first face of a document, said document including at least a machine-readable code, and wherein said system further includes a means for scanning said machine-readable code and outputting an identifying signal representing said code.

5. The system according to claim 4 further comprising means for storing in said storage means said identifying signal in response to said store signal.

6. The system according to claim 4, wherein in said machine-readable code is contained on a second face of said document.

7. An information retrieval system for retrieving and displaying information from relevant documents comprising:
   an image forming means outputting a digitized representation of information contained on at least one face of each of at least one document;
   image sizing means connected to the output of said imaging forming means for determining the size of said digitized representation of information;
   means for storing said digitized representation of information only when said size exceeds a reference value size;
   means for displaying said stored digital representation as a video image of one of said relevant documents.

8. The apparatus according to claim 7, wherein said document contains machine-readable code and wherein said system further comprises a means for scanning said machine-readable code and a means for storing in said storage means said machine-readable code from said document corresponding to said stored digital representation.

9. The apparatus according to claim 8 further comprising a means for displaying said machine-readable code simultaneous with said display of said digitized representation.

10. The apparatus according to claim 9 further comprising a main data base containing data related to said machine-read code and a means for displaying on said display said data simultaneous with said corresponding stored digital representation.

11. Apparatus according to claim 8, wherein said machine-readable code is positioned on one face of said document opposite to said face containing said image.

12. A method of storing all information contained on selected documents comprising the steps of:
   forming a digital image of all information on each of a plurality of documents;
   compressing said digital image of each document;
   detecting the size of said compressed image of each document;
   comparing the size of said compressed image with a reference value and storing said compressed image only when said size exceeds said reference value to thereby store information contained only on said selected documents.

13. The method according to claim 12 further comprising the step of expanding said stored compressed image.

14. The method according to claim 12, wherein said information is contained on a first face of a document, said document further containing at least a machine-readable code and wherein said method includes the further steps of scanning said machine-readable code and outputting an identifying signal representing said code.

15. The method according to claim 14 further comprising the step of storing said identifying signal simultaneous with the storage of said compressed image.

* * * * *